United States Patent
Chow

(12) United States Patent (10) Patent No.: US 8,983,673 B2
Chow (45) Date of Patent: Mar. 17, 2015

(54) IMPLEMENTING POWER MANAGEMENT SYSTEMS USING PEAK DEMAND FACTOR

(75) Inventor: Bryan M. Chow, Brooklyn, NY (US)

(73) Assignee: Green Charge Networks LLC, Santa Clara, CA (US)

(*) Notice: Subject to any disclaimer, the term of this patent is extended or adjusted under 35 U.S.C. 154(b) by 495 days.

(21) Appl. No.: 13/560,948

(22) Filed: Jul. 27, 2012

(65) Prior Publication Data

US 2013/0030595 A1 Jan. 31, 2013

Related U.S. Application Data

(60) Provisional application No. 61/513,167, filed on Jul. 29, 2011.

(51) Int. Cl.
 *H02J 3/14* (2006.01)
(52) U.S. Cl.
 CPC ............... *H02J 3/14* (2013.01); *Y02B 70/3225* (2013.01); *Y04S 20/222* (2013.01)
 USPC .......................................................... 700/297
(58) Field of Classification Search
 CPC ................................................ H02J 2003/146
 USPC .......................................................... 700/297
 See application file for complete search history.

(56) References Cited

U.S. PATENT DOCUMENTS

2009/0006279 A1* 1/2009 Buettner et al. ............... 705/412
2010/0145534 A1* 6/2010 Forbes et al. ................. 700/291

* cited by examiner

*Primary Examiner* — Kenneth Lo
*Assistant Examiner* — Geoffrey Wellman
(74) *Attorney, Agent, or Firm* — Richard C. Galati; Holland & Hart LLP

(57) ABSTRACT

Methods and apparatus for implementing power management systems using a peak demand factor are described and disclosed herein. An exemplary method includes gathering load samples from a site, generating a plurality of peak demand factors based on the load samples, performing an analysis to determine feasible demand reduction based on the peak demand factors, such as by plotting the demand reduction against the peak demand factors and finding one or more points at which demand reduction is particularly advantageous, selecting a maximum percentage of peak reduction matched with a peak demand factor, and implementing a power management system corresponding to the selected peak demand factor. Embodiments disclosed may quickly determine a superior peak demand reduction strategy or configuration for a site, thereby reducing the time and labor costs of excessive experimentation presently used to implement demand management systems.

20 Claims, 3 Drawing Sheets

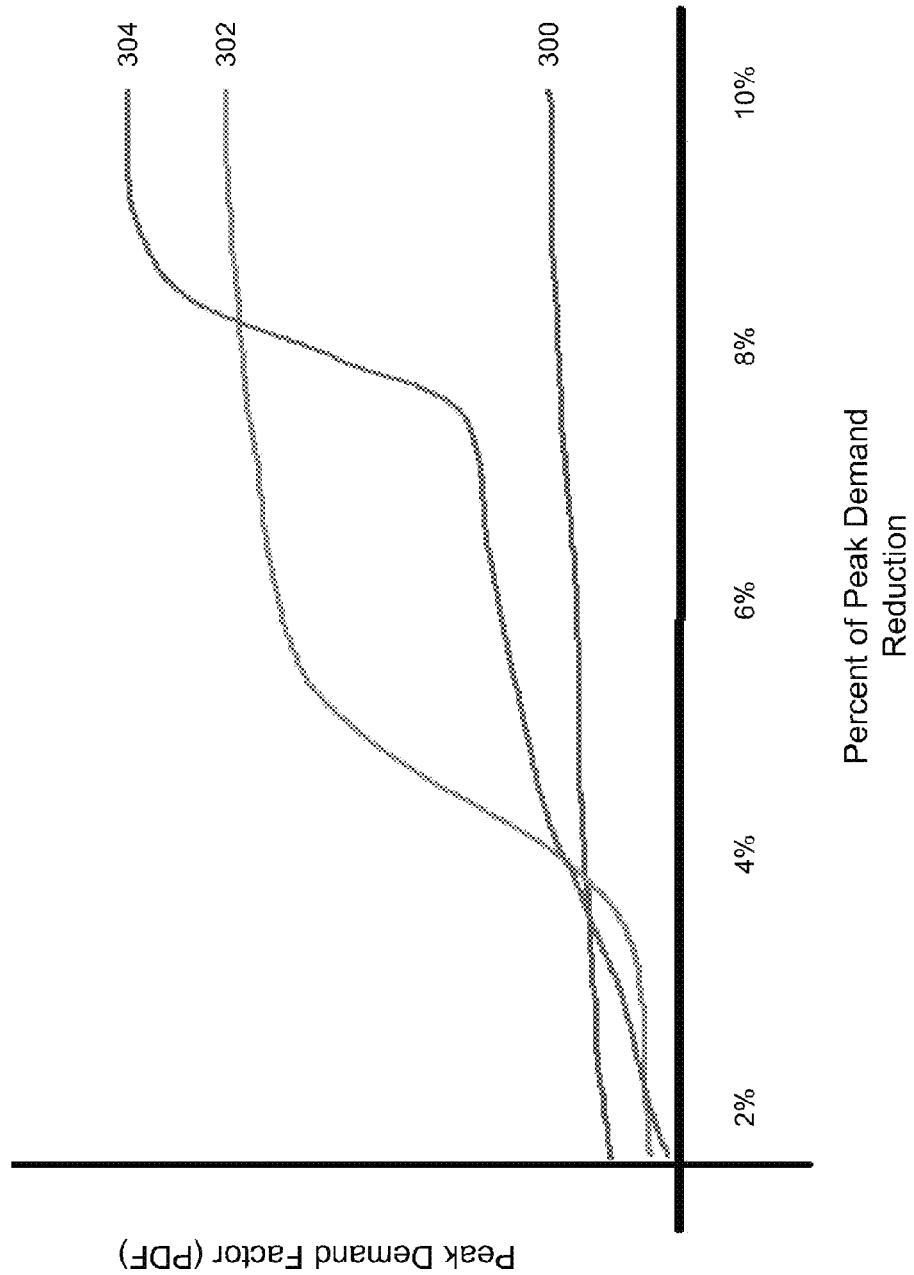

IMPLEMENTING POWER MANAGEMENT SYSTEMS USING PEAK DEMAND FACTOR

CROSS REFERENCE TO RELATED APPLICATIONS

Priority is claimed to the following related pending U.S. Provisional Patent Application, which is hereby incorporated by reference in its entirety: Ser. No. 61/513,167, filed Jul. 29, 2011.

BACKGROUND

The present invention relates to the fields of electrical utility usage mitigation and optimization, designing and implementing power management systems for electrical utility customers, and related fields.

Today's electrical utility providers operate in a quickly changing environment with limited resources and little room for error. Power demands placed on the utility grid continuously and randomly fluctuate while the requirements necessary to satisfy these demands change on an hourly basis. Although hourly demands are somewhat predictable, utilities are expected to provide consistent and reliable power, regardless of what occurs in real time. Due to peaks in demand during the waking hours of 6 a.m. to 10 p.m., and during summer months, electricity providers contract with "peaking" power plants to receive energy for a limited time as needed to provide power when normal power plant production cannot match demand. Peaking plants are an expensive source of power, so electricity providers pass on some of the burden of the cost of that power by billing a "demand charge" to certain types of customers based on the magnitude of their highest recorded energy consumption rate during a billing period. This practice gives customers an incentive to avoid causing spikes in energy consumption, so that electricity providers reduce their dependence on additional peaking power plants to meet service capacity requirements. Minimizing consumption spikes also delays or makes obsolete the need to upgrade the electrical distribution infrastructure which is only implemented to compensate for periods of highest consumption.

In response to being billed for demand charges, customers have sought to develop inventive peak mitigation and load leveling methods to save money and make more efficient use of their electrical resources. Peak mitigation methods are designed to reduce or completely remove peaks in consumption, such as by turning off loads when peak conditions approach (i.e., "load shedding") or by using power generation or energy storage to provide power to the site during peak periods, so that the peak power that is actually measured by the electrical provider is lower than it would otherwise be. Load leveling methods are designed to reduce loads during prolonged peak periods by discharging energy storage to supplement grid-provided power to a site, then to recharge the energy storage during off-peak periods to prepare for the next peak period, thereby "leveling" the overall consumption curve of the site and reducing demand charges. These methods are effective, but because they use expensive energy storage devices, generators, and associated hardware, they are typically designed to meet minimum requirements for the site. Furthermore, it can be difficult to determine whether a site is a good candidate for peak mitigation or load leveling without time-consuming electricity usage data monitoring and analysis.

BRIEF SUMMARY

Embodiments of the present invention allow a user to simultaneously compare and sort peak demands across the load profiles of many sites to prepare and configure power management systems for peak mitigation. A number of time-stamped demand level samples are gathered from a site and analyzed to find a peak demand factor. If the peak demand factor falls within a desired threshold range, a power management system is designed for the site based on its load profile characteristics. Sites may be categorized according to the peak demand factors of their load profiles in order to identify the electricity consumers that would gain the greatest benefit from the installation of a power management system for peak mitigation or load leveling, and then those systems may be installed with properties that meet their individual needs.

In some embodiments the peak demand factor is used as a peak mitigation planning tool to choose a peak demand reduction method or to choose the components needed in a power management system used to perform that method at the site. To plan out a peak demand reduction method and hardware, the peak demand factor may be calculated for various peak percentage classifications, the peak demand factors are compiled, and the compiled peak demand factors are compared to find a preferable peak reduction percentage, such as by plotting the peak demand reductions and identifying the points at which the peak demand reductions produce an acceptable peak demand factor. The preferable peak reduction percentage is then factored into the design for components of a power management system for the site so that components such as an energy storage device and inverter in the system will have the capacity needed to mitigate peaks as they arise without frequent demand charge increases.

The invention may provide a method for quickly determining a superior peak demand reduction strategy to implement at a site, thereby reducing the time and labor costs of excessive experimentation or manually sifting through data to determine an optimal peak reduction implementation. These methods may also provide a user with the ability to rate the effectiveness of peak reduction systems at sites and determine the suitability of such systems for demand charge management.

For example, in some embodiments, a method of optimizing power management system characteristics for peak mitigation of a site is provided, the method comprising: gathering a plurality of load samples from a site; classifying load samples as peak-range load samples for load samples exceeding a peak threshold level; determining characteristic data of the load samples, the characteristic data at least comprising a first factor representing a ratio of the number of peak-range load samples to the total number of load samples, a second factor representing the ratio of the magnitude of one or more peak range load samples to a representative measure of central tendency of the load samples, and a third factor representing the variance of the load samples; calculating a peak demand factor for the site using the characteristic data; assigning a peak mitigation category to the site by comparing the peak demand factor to reference data, the reference data comprising power management system characteristics associated with one or more peak demand factors; and generating optimized power management system characteristics for the site using the power management system characteristics associated with the peak mitigation category assigned.

In some embodiments, the peak demand factor is calculated by multiplying the first factor, the second factor, and the third factor. In some embodiments, the peak demand factor is proportional to the first factor, and inversely proportional to the second factor and to the third factor. In some embodiments, the reference data comprises peak demand factors of other sites. In some embodiments, the reference data comprises previously-calculated peak demand factors of the site. In some embodiments, the load samples are gathered at a rate at least approximately matching the rate at which a utility provider gathers load samples from the site in determining a demand charge. In some embodiments, the number of load samples gathered is within the range of 24 to 8928, inclusive, which may correspond to a range of one measured sample per hour for a day or one sample per five minutes for a 31-day billing cycle. In some embodiments, the characteristic data further comprises a fourth factor representing the frequency of peaks occurring over a period of high average consumption at the site. In some embodiments, the power management system characteristics comprise an energy storage system minimum capacity level and a power converter minimum power output level. In some embodiments, the method further comprises providing an optimized power management system to the site having the optimized power management system characteristics.

In another embodiment, a non-transitory computer-readable medium containing instructions is provided, in which the instructions, when executed by a processor of a computer, cause the computer to perform steps of the methods described herein.

In another embodiment a method of optimizing power management system characteristics for peak mitigation of a site is provided, wherein the method comprises: gathering a plurality of load samples from a site; calculating peak demand factors for the site using the characteristic data for a plurality of demand reduction levels, wherein the characteristic data at least comprises a first factor representing a ratio of the number of peak-range load samples to the total number of load samples, a second factor representing the ratio of the magnitude of one or more peak range load samples to a representative measure of central tendency of the load samples, and a third factor representing the variance of the load samples; determining an optimized peak demand factor within the calculated peak demand factors; and generating optimized power management system characteristics for the site corresponding with the optimized peak demand factor.

In some embodiments, the characteristic data further comprises a fourth factor representing the frequency of peaks occurring over a period of high average consumption at the site. In some embodiments, the load samples are gathered at a rate at least approximately matching the rate at which a utility provider gathers load samples from the site in determining a demand charge. In some embodiments, determining an optimized peak demand factor comprises calculating a ratio of peak demand factor to demand reduction level for each of the demand reduction levels, and assigning the peak demand factor having the lowest ratio as the optimized peak demand factor. In some embodiments, determining an optimized peak demand factor comprises plotting the peak demand factors against corresponding demand reduction levels, and assigning the peak demand factor having a maximum second-order derivative of the plot as the optimized peak demand factor. In some embodiments, determining an optimized peak demand factor comprises determining the costs of providing a power management system at the site corresponding with each peak demand factor, calculating a ratio of the costs to demand reduction level for each of the demand reduction levels, and assigning the peak demand factor having the lowest ratio as the optimized peak demand factor. In some embodiments, the optimized power management system characteristics comprise an energy storage system minimum capacity level and a power converter minimum power output level. In some embodiments, the method further comprises providing an optimized power management system to the site having the optimized power management system characteristics.

In another embodiment, a non-transitory computer-readable medium containing instructions is provided, in which the instructions, when executed by a processor of a computer, cause the computer to perform steps of the methods described herein.

Additional and alternative features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features.

FIG. 3 shows a plot of peak demand factors against their corresponding percent demand charge reduction that may be used in analysis of peak demand factors.

DETAILED DESCRIPTION

Figure 1:
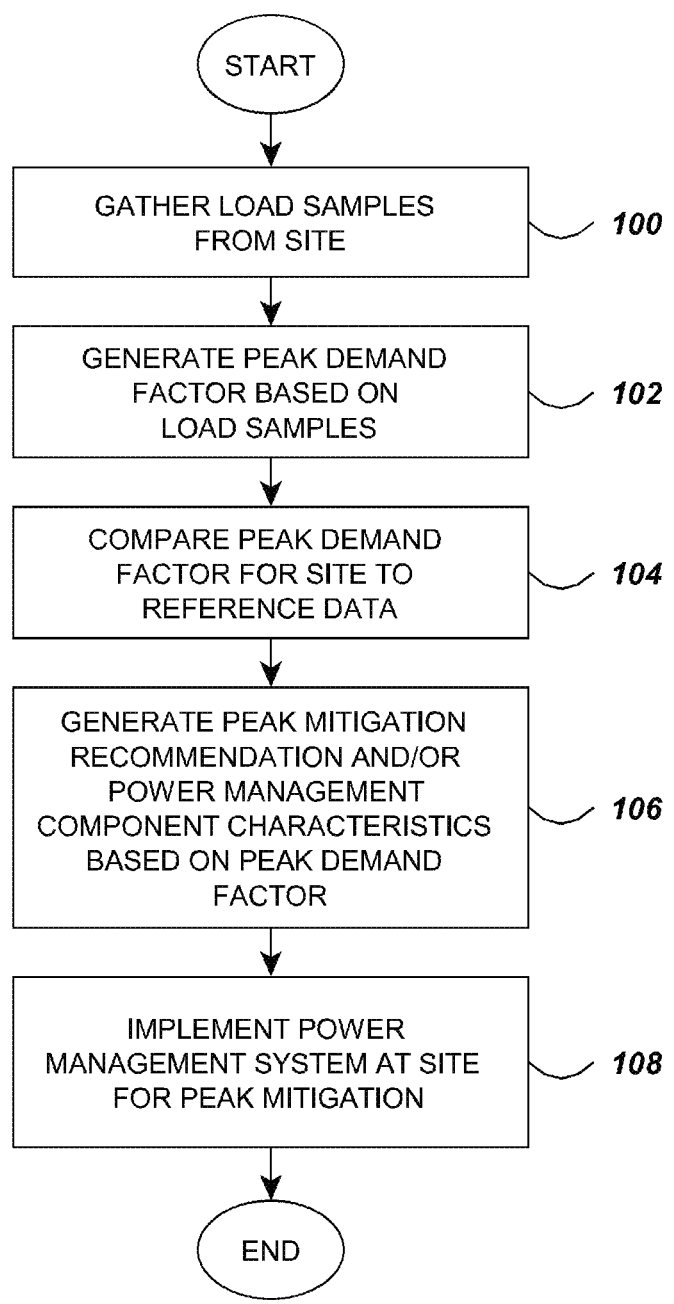
FIG. 1 shows a flowchart of a method for generating a peak demand factor and implementing a power management system at a site for peak mitigation.

Peak mitigation is a process by which demand charges may be decreased or prevented by reducing the magnitude of short peaks or spikes in a location's electrical utility consumption. A peak mitigation apparatus is typically used by discharging energy storage into the location's electrical system (or by reallocating loads from the site's electrical system to energy storage devices or other independent power sources) in order to prevent the power consumption recorded by the site's utility billing meter from exceeding a maximum value. If rechargeable energy storage is present, it may then be recharged during off-peak periods to regain the energy discharged in preparation for the next peak demand event. A system controller, such as a computer, may be employed to monitor the power consumption of the site and to manage the charging and discharging of energy storage devices or the activation and deactivation of power generation in the system when appropriate.

The energy storage devices are frequently batteries of many types, but may also comprise capacitors, flywheels, and comparable energy storage devices that may be used to store and discharge power on demand, and the energy storage devices are typically connected to the site's electrical system via inverters, DC-DC converters, or other power converters to adapt the stored energy into a useable form for the site's systems and loads.

Complications may arise when peaks are too frequent or are too high, consuming a great deal of power over a period of time. For example, if consumption exceeds the threshold limit over which the energy storage devices enter a mitigation/discharge mode for too long, the energy storage is depleted and unable to mitigate. At that point, the threshold limit increases to the highest level recorded by the utility meter that will result in a demand charge to the consumer. From that point on during that particular billing period, the threshold limit remains at that elevated level because no matter how energy is managed from that point on during the billing cycle, the demand charge will be based on that elevated level. However, at the end of the billing period the threshold limit resets and the cycle starts over again from a low threshold limit, such as zero kilowatts.

In addition to demand charges being affected by depletion of energy storage devices over prolonged peak periods, the magnitude of a peak may have a direct effect on the demand charge produced. For example, when a particularly high peak load is experienced by the system, the power converter or inverter may not be able to provide enough power to respond to the rise before there is an increase in the baseline peak load limit. An inverter rated for a maximum of fifty kilowatts of power transfer is unable to convert power from the energy storage to mitigate a peak that is higher than fifty kilowatts above the threshold limit, so the threshold limit increases if the peak is not completely mitigated to remain below the threshold limit. Even if a power converter can support virtually unlimited energy transfer rates, a very high peak quickly depletes available energy storage, leading to inability of the management system to respond to a peak. Similarly, on-site power generation devices have limited output ability that can be exceeded when peaks are too high or the power management system is poorly designed. Therefore the maximum load experienced by the utility meter during a billing period increases over time, along with the demand charge.

Load leveling is a process by which loads at a site are evened out over a given time period. The power management systems employed in load leveling are essentially the same as those used in peak mitigation but usually have higher storage capacity and do not need to respond to fast changes in consumption. This is typically true because whereas peak mitigation is designed to reduce or eliminate short peaks in consumption, load leveling is designed to eliminate "peaks" that may last for hours at a time, and then recharge for hours at a time. Such systems include load leveling for summer months, where if loads throughout the day and night can be leveled off, drastic electricity usage savings can be realized because the daytime energy billing rates may be much higher than the nighttime billing rates. Peak mitigation and load leveling are therefore both implemented with similar goals in mind—to reduce consumption at inopportune times, such as when demand charges and other higher utility costs will be incurred.

The peak mitigation and load leveling effectiveness of a power management system may be limited. The limits come from the characteristics of power consumption peaks of the site, the characteristics of the energy storage or power generation available, and the characteristics of the equipment that is used to connect them to the site's electrical system, as discussed above. One aspect of the invention is a tool that may be used to assist the user in determining which sites would be well-suited for a power management system, and it may also help in determining specifications for the components used in those power management systems. Part of this process requires calculating a peak demand factor. The peak demand factor (PDF) may take into account several characteristics of the peak demand measured at the site according to the following equation:

$$PDF = \frac{(N_P)(\lambda)(k)}{(N_{tot})(P_{max})(\sigma)}$$

$N_P$ is the number of demand or consumption level samples that fall into the peak demand category. The nature of the samples and sampling methods may vary in the different embodiments of the invention. For example, a sampling method may be performed by taking continuous readings of the consumption of the site in question, or a sample may be taken on a periodic, sporadic, intermittent, or user-defined basis. The samples may also be gathered as manipulated raw consumption readings, such as by averaging the raw consumption over one minute, five minutes, one hour, one day, or any other length time period to produce a sample for each interval. It may be advantageous to gather manipulated raw readings as samples when determining the peak demand factor in cases where the power company bills demand charges based on, e.g., the maximum five-minute-averaged consumption of the site or the highest sustained consumption over a short time period, because the peak demand factor will then use samples that would realistically result in demand charges. It is often preferable to match or closely approximate the sample readings with the readings that the utility provider uses when determining the demand charge for the site.

An underlying element in determining the peak demand factor is the definition of a peak in consumption. In some embodiments, a peak is a set of demand values that exceed a percentage portion of the magnitude of the highest demand value in the set. For example, it may be that the highest demand value for the site is 300 kW. In this example, if a peak is defined based on 80% of the highest demand value, then any sample point of 240 kW and above is considered a peak. Other embodiments may define peaks differently, such as by exceeding the mean or median of the samples or some other selected value by a number or percentage, by classifying a subset of samples as peaks if their standard deviation exceeds a predetermined limit, or other similar statistical or mathematical classification methods.

$N_{tot}$ is the total number of samples in the data set, including peak values and non-peak values. The value of $N_{tot}$ for the data set may be in a range from 2 values to 10 values to 100 values to 10,000 values to 1,000,000 values or more. A relatively large number of samples taken over many days, weeks, or months may be preferable in order to obtain a well-rounded picture of the consumption fluctuations that the site can expect on a regular basis. A practical minimum total number of samples could be 24, assuming one reading is made per hour for a day (720 in a common billing cycle), or 2,880, where readings are taken at 15-minute intervals for a 30-day month, which corresponds to a common billing cycle used by utility providers. A larger number of samples or a shorter space of time between sampling may grant greater accuracy and give a more well-defined snapshot of the demand and consumption requirements of the site. Preferably, the total number of samples cover at least one 24-hour period so that the site's entire load curve may be considered, including at least one daily high sample and one daily low sample. At five minute intervals, this comes out to 288 samples in 24 hours, or 8,928 samples in a 31-day monthly billing cycle. The data used in determining a demand charge may be recorded by a smart meter or other recording device at standard fifteen minute intervals, so the peak demand factor may be tuned to process the site's consumption data at that level, but in some embodiments it may also be scaled to process a smart meter data stream at other data rates as well. For example, the recording device may process consumption data every hour, every minute, every fifteen seconds, every second, any fraction of a day, hour, minute, or second, etc.

λ in the equation is simply the mean of all samples taken in the data set.

$P_{max}$ is the highest recorded consumption sample or peak consumption value for the site that would be used in calculating a demand charge for the utility customer. Because power companies and electrical utility providers may calculate demand charges differently in each case and because peaks may be defined differently by the user, this value may be determined differently according to individual implementations of the invention. For example, in some cases a demand charge may be based on the highest demand out of many five-minute averages recorded over a billing period, but in other cases a demand charge may be based on the highest demand sustained for ten minutes or longer during a billing period. Therefore, as seen in these examples, $P_{max}$ might not be the actual maximum demand value reached that billing period if the demand charge is based on an average of many demand values or if the highest demand was not sustained for a long enough time.

σ is a factor indicating variance within the data set of samples. In some embodiments, σ is the standard deviation, root mean square deviation, or weighted sum of the samples.

k in the equation is a scaling constant, such as 100,000, that may be experimentally determined and is primarily applied to the PDF for convenience to the user in working with typical consumption data sets. The value of the scaling constant may be any nonzero real number, and should be selected consistently in calculating peak demand factors when the peak demand factors will be compared to each other. A multiple of ten could be a practical value for k to make the peak demand factors more manageable and comparable to an average user. In some cases, k may equal one and may not affect the peak demand factor at all.

To explain the components that make up the equation, the peak demand factor equation may be alternatively written as:

$$PDF = \frac{N_P}{N_{tot}} * \frac{\lambda}{P_{max}} * \frac{1}{\sigma} * k.$$

The first ratio in this formulation, $N_P/N_{tot}$, brings to the peak demand factor a perspective of the duration and/or frequency of the peaks in demand relative to the total time represented by the set of data. Peak demands that have a longer duration or more frequent occurrence cause this ratio in the peak demand factor to increase, thereby increasing the overall peak demand factor, since frequent peaks tend to show that it would be difficult or expensive to implement a power management system for peak mitigation at the site that could handle such frequent or long-lasting discharge periods.

The second ratio in the formula, $\lambda/P_{max}$, is the proportion of the mean to the maximum peak magnitude, and it helps the peak demand factor to reflect the character of the magnitude of the peaks with respect to the magnitude of the mean. If the peak observed is larger in magnitude, the peak demand factor should decrease. Large peaks relative to the mean are more beneficial to mitigate than small peaks because they have more of an impact on the demand charge incurred at the site, and if they have a short duration, they may be mitigated with relatively inexpensive equipment because smaller energy reserves are required.

The third ratio is the inverse of the variance to ensure that as variance of the data set increases, the peak demand factor decreases. Variance makes a site more suitable for power management systems because if a site has great enough unpredictability in consumption, it is more likely that the peak demand reached could be mitigated with an intelligent power controller. The sporadic rise and fall of consumption allows a power management system to discharge to mitigate peaks and then recharge during "valleys" in consumption. On the other hand, demand charges for sites with steady or fairly consistent demand would be extremely difficult to lower because the peaks in demands are long in duration and not sporadic, and recharging periods are likewise limited.

Referring now to the figures in detail, FIG. 1 shows a flowchart of a method for generating a peak demand factor and implementing a power management system at a site for peak mitigation. First, load samples are gathered from a site at step 100. The load samples are then used as a basis to generate a peak demand factor for the site at step 102. The peak demand factor of step 102 is compared with reference data in step 104, and a peak mitigation suitability recommendation for the site and/or power management system component characteristics are generated in step 106. This recommendation or characteristics are used to implement a power management system at the site for peak mitigation in step 108.

Load samples in step 100 may include consumption data from the site, such as the overall consumption read by an electric meter over time or the consumption of certain loads at the site over time. It may be preferable to match load sample data to the data used by the power company in determining a demand charge so that the load samples may be accurately used to predict the charges expected from the power company. Load samples may be gathered from sensors such as an analog or digital/computerized electricity billing meter, or may be derived values based on, for example, voltage and amperage readings near an electrical grid connection of the site or at loads that contribute to high consumption. The gathered samples may then be stored in a storage medium or sent to a server or other computer for tracking and monitoring the data.

The peak demand factor is generated in step 102 according to the formulation described previously in this section or according to a similar method of calculation that is: (a) inversely proportional to the variance or standard deviation of the data, (b) inversely proportional to the magnitude of the maximum peak encountered relative to an average or base load, and (c) proportional to the duration and/or frequency of occurrence of peak values. The definition of a peak, the type of variance used, and the way that the magnitude of the maximum peak and duration and frequency of all peaks are represented in the formulation may vary from the previously disclosed formulation in some embodiments without departing from the scope and spirit of the invention.

The peak demand factor calculation method may additionally take into account the number of peak occurrences during peak hours. This element factors in how many times during the sample time period a peak was reached and may be weighted by the magnitude and time-proximity of the peaks occurring.

In step 104 the peak demand factor of the site is compared to reference data, which reference data may include other sites' calculated peak demand factors, ideal peak demand factors, user-defined peak demand factors, historical peak demand factors from the same site, forecasted peak demand factors, etc. In some embodiments step 104 helps to rank or sort the site's peak demand factor amongst the reference data to give perspective into whether the power management systems that are designed for other sites would be suitable for the present site and/or whether a power management system would be desirable for the site at all. In one embodiment, a list of reference data may be populated with peak demand factors of many sites, and the peak demand factor of the user's site may be compared to the list to find sites with similar peak demand factors. The user may then closely compare the consumption curve characteristics of the user's site to the similar sites and thereby determine whether a power management system may be effective at the user's site and how power management systems of the similar sites may be used or modified to be used at the user's site. For this purpose a user may have predetermined values of the peak demand factor for comparison, such as in a case where a power management system is not economically feasible or advisable if the peak demand factor of the site lies above a certain number, a power management system may be beneficial if the peak demand factor falls between two threshold numbers, or a power management system may be recommended if the peak demand factor is below a numerical limit.

The peak mitigation recommendation of step 106 is related to this purpose because it provides information as to whether a site is suitable for peak mitigation or load leveling and/or provides information about how a power management system should be designed to mitigate the peaks or level the loads of that site. For example, the energy storage device and power converters of a site with a similar peak demand factor (or that falls within a similar peak demand factor category) may be used as a basis for designing a power management system that can serve all sites with the same or similar peak demand factor.

The peak demand factor may help to reveal the amount of effort required to mitigate the peaks. The peak demand factor of a perfectly level load would be an extremely large number (approaching infinity) indicating that to reduce the highest recorded "peak," which in this case is 100% of the time, a huge amount of effort and resources are required to lower the reading on the revenue meter. A peak demand factor of a consumption curve with one brief peak per demand charge billing cycle would produce a very low peak demand factor, showing that relatively little equipment would be required to reduce the demand charge in that situation. Thus, a peak demand factor can optimize the energy storage system at a site to find its minimum storage capacity required and can optimize power converters to provide energy or power to the site to find their minimum output power capabilities. This leads to more efficient use of resources and less expensive equipment (since price typically corresponds directly with capacity in these systems).

Step 108 is performed in some embodiments where the peak mitigation recommendation of step 106 advises implementation of a power management system at the site for peak mitigation or load leveling. If the recommendation of step 106 optionally advises against implementation, a power management system might not be implemented as well.

Figure 2:
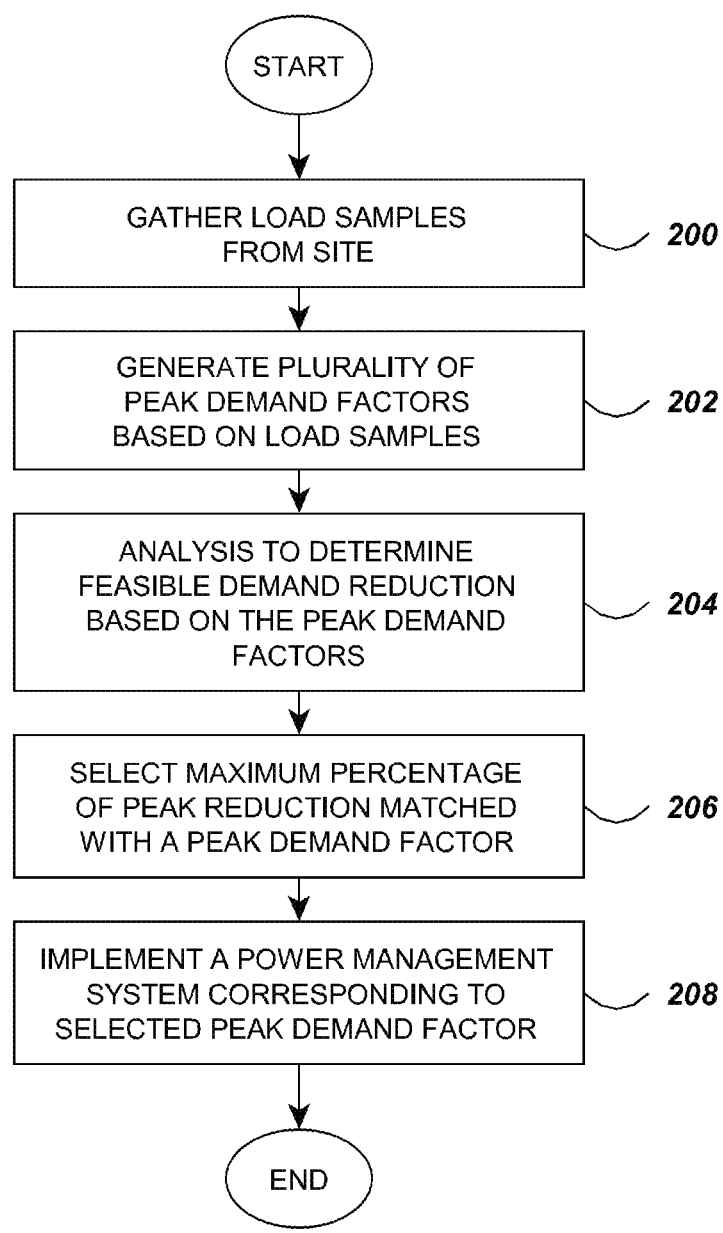
FIG. 2 shows a flowchart of a method for generating a plurality of peak demand factors and implementing a power management system at a site corresponding to a selected peak demand factor.

FIG. 2 is a flowchart outlining a method for generating a plurality of peak demand factors and implementing a power management system at a site corresponding to a peak demand factor selected from the plurality of peak demand factors. In step 200, load samples are gathered from the site for which the peak reduction is proposed. The samples may be gathered in the same methods and fashion as the gathering of load samples in step 100. The load samples are then used to generate a plurality of peak demand factors in step 202. The peak demand factors differ from each other in the definition of a "peak," e.g., changing the number or proportion of load samples that fall into the "peak" demand category ($N_P$).

In step 204 an analysis is performed to determine feasible demand reduction based on the peak demand factors generated in step 202. The objective of performing this step is to determine a range of peak reduction amounts that could be feasible to pursue, if such a limitation exists. One way this may be done is by plotting the peak demand factors against the projected demand charge savings due to the installation of power management systems that meet the peak demand factors. FIG. 3 shows an example of a plot that could be generated according to this step. The peak demand factor is plotted against various amounts of peak demand reductions. At some sites, this plot will not show that peak demand factor significantly changes as peak demand reduction is increased, or that the peak demand factor changes slowly and consistently, such as line 300. Those sites may be good candidates for power management systems because great demand reduction can be produced by relatively small peak demand factors and correspondingly small power management systems. A demand curve with a low peak demand factor can have its demand charges reduced more efficiently because either a smaller system is required or the system has to react to peaks less often. Other sites such as the ones represented by lines 302 and 304 show that a range of peak demand reductions results in greater gains in peak demand factor per peak demand reduction increment. For example, line 302 has such a space at a lower peak demand reduction range than line 304. This plot may assist the user in selecting a peak demand reduction that will provide especially effective demand charge reduction, such as a point on the left of the steep slopes of lines 302 or 304 where small increases in the peak demand factor produce significant increases in peak demand reduction. For example, a percent peak demand reduction that is below approximately 3.5 percent for line 302 has a much lower peak demand factor than a percent peak demand reduction of 3.5 percent or higher since the peak demand factor rises so quickly after the four percent mark. Likewise, a percent peak demand reduction at or below approximately 7.5 percent would be preferred for the site represented by line 304 since there is a drastic rise in peak demand factor beyond that point.

The axis labels of FIG. 3 are provided for illustration purposes and for convenience in referring to the figure, and should not be understood to represent limits on the peak demand reduction that may be considered or accomplished when implementing embodiments of the invention. Although the horizontal scale ranges from two to ten percent, demand reductions of smaller and larger ranges of peak demand reduction, such as 0-2%, 0-100%, 20-50%, etc., may be considered and implemented as desired.

The demand charge savings may also be net demand charge savings reflecting the total return on investment (ROI) of the power management system. This may be calculated by estimating the demand charge savings accumulated over the lifetime of the power management system and subtracting the total cost of the power management system including equipment costs, labor costs, repair costs, and any other potential power management system-related expenses. At very low and very high levels of peak mitigation, the savings might not outweigh the costs of the system and the system may not be feasible, so the comparison step allows the user to find an ideal balance between the demand charge savings realized and the costs of operating the system.

In other embodiments of step 204, one may plot the peak demand factors against the up-front or recurring costs of buying and owning the power management system and then compare the costs of the power management system to the peak demand addressed to find a point where low costs meet with favorable peak demand factors (or, in some embodiments, peak demand reduction levels). This particular method disregards the amount of potential demand charge savings that a given peak demand factor would provide for the site. The costs of the power management system do not increase linearly with the peak demand factor in every case, such as if the energy storage devices that would be used in the system are sold in standardized sizes and cannot be purchased in quantities that precisely match the requirements of the site.

Taking a maximum second-order derivative of the plotted points (or an approximation thereof) may also allow a user to uncover economically advantageous peak demand reductions. A maximum of this derivative may identify points of inflection around which the peak demand reduction may be adjusted for maximum demand reduction savings and/or minimum power management system costs.

In step 206, a maximum percentage of peak reduction is selected and matched with a peak demand factor using the results of the analysis of step 204. Visual inspection of the points plotted may provide an indication of which peak demand reductions would be most economically advantageous to implement. A maximum second-order derivative of the plotted points may also allow a user to uncover economically advantageous peak demand reductions. This peak reduction value may be used to generate a peak mitigation system recommendation which may contain, for example, specifications of a power management system, programming or other instructions for charging and discharging the power management system, or a determination that a power management system would not be recommended for the site.

A power management system may be implemented at the site in step 208 that corresponds to the selected peak demand reduction of step 206. The selected peak demand reduction assists the designer in determining the capabilities of components of the power management system required, such as energy storage capacity and inverter throughput ability, which will be most cost-effective and efficient in peak mitigation or load leveling. This step may also include the installation of the system, connection to loads and meters at the site, programming the system, setting values for when and how it will turn on and off, and other hardware and software related considerations.

Some methods and systems of the embodiments of the invention disclosed herein may also be embodied as a computer-readable medium containing instructions to complete those methods or implement those systems. The term "computer-readable medium" as used herein includes not only a single physical medium or single type of medium, but also a combination of one or more tangible physical media and/or types of media. Examples of a computer-readable medium include, but are not limited to, one or more memory chips, hard drives, optical discs (such as CDs or DVDs), magnetic discs, and magnetic tape drives. A computer-readable medium may be considered part of a larger device or it may be itself removable from the device. For example, a commonly-used computer-readable medium is a universal serial bus (USB) memory stick that interfaces with a USB port of a device. A computer-readable medium may store computer-readable instructions (e.g. software) and/or computer-readable data (i.e., information that may or may not be executable). In the present example, a computer-readable medium (such as memory) may be included to store instructions for the calculation, plotting, transmission or display of information, and other actions or processes performed in the steps of the methods described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In addition, it should be understood that the figures described above, which highlight the functionality and advantages of the present invention, are presented for example purposes only and not for limitation. The exemplary architecture of the present invention is sufficiently flexible and configurable, such that it may be utilized in ways other than that shown in the figures. It will be apparent to one of skill in the art how alternative functional, logical or physical partitioning, and configurations can be implemented to produce or implement the desired features of the present invention. Also, a multitude of different constituent module or step names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in multiple various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments. The invention is also defined in the following claims.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "typical," "conventional," "traditional," "normal," "standard," "known" and terms of similar meaning should not be construed as limiting the time described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise or context dictates otherwise. Similarly, a group of items linked with the conjunction "or" should not be read as requiring mutual exclusivity among that group, but rather should also be read as "and/or"

unless expressly stated or context dictates otherwise. Furthermore, although items, elements or component of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A method of optimizing power management system characteristics for peak mitigation of a site, the method, implemented on a computer comprising:
    gathering a plurality of load samples from a site;
    classifying load samples as peak-range load samples for load samples exceeding a peak threshold level;
    determining characteristic data of the load samples, the characteristic data at least comprising:
        a first factor representing a ratio of the number of peak-range load samples to the total number of load samples,
        a second factor representing the ratio of the magnitude of one or more peak range load samples to a representative measure of central tendency of the load samples, and
        a third factor representing the variance of the load samples;
    calculating a peak demand factor for the site using the characteristic data;
    assigning a peak mitigation category to the site by comparing the peak demand factor to reference data, the reference data comprising power management system characteristics associated with one or more peak demand factors; and
    generating optimized power management system characteristics for the site using the power management system characteristics associated with the peak mitigation category assigned.

2. The method of claim 1, wherein the peak demand factor is calculated by multiplying the first factor, the second factor, and the third factor.

3. The method of claim 1, wherein the peak demand factor is proportional to the first factor, and inversely proportional to the second factor and to the third factor.

4. The method of claim 1, wherein the reference data comprises peak demand factors of other sites.

5. The method of claim 1, wherein the reference data comprises previously-calculated peak demand factors of the site.

6. The method of claim 1, wherein the load samples are gathered at a rate at least approximately matching the rate at which a utility provider gathers load samples from the site in determining a demand charge.

7. The method of claim 1, wherein the number of load samples gathered is within the range of 24 to 8928, inclusive.

8. The method of claim 1, wherein the characteristic data further comprises:
    a fourth factor representing the frequency of peaks occurring over a period of high average consumption at the site.

9. The method of claim 1, wherein the power management system characteristics comprise an energy storage system minimum capacity level and a power converter minimum power output level.

10. The method of claim 1, further comprising:
    providing an optimized power management system to the site having the optimized power management system characteristics.

11. A non-transitory computer-readable medium containing instructions, the instructions, when executed by a processor of a computer, causing the computer to perform steps comprising:
    gathering a plurality of load samples from a site;
    classifying load samples as peak-range load samples for load samples exceeding a peak threshold level;
    determining characteristic data of the load samples, the characteristic data at least comprising:
        a first factor representing a ratio of the number of peak-range load samples to the total number of load samples,
        a second factor representing the ratio of the magnitude of one or more peak range load samples to a representative measure of central tendency of the load samples, and
        a third factor representing the variance of the load samples;
    calculating a peak demand factor for the site using the characteristic data;
    assigning a peak mitigation category to the site by comparing the peak demand factor to reference data, the reference data comprising power management system characteristics associated with one or more peak demand factors; and
    generating optimized power management system characteristics for the site using the power management system characteristics associated with the peak mitigation category assigned.

12. A method of optimizing power management system characteristics for peak mitigation of a site, the method, implemented on a computer comprising:
    gathering a plurality of load samples from a site;
    calculating peak demand factors for the site using the characteristic data for a plurality of demand reduction levels, wherein the characteristic data at least comprises:
        a first factor representing a ratio of the number of peak-range load samples to the total number of load samples,
        a second factor representing the ratio of the magnitude of one or more peak range load samples to a representative measure of central tendency of the load samples, and
        a third factor representing the variance of the load samples;
    determining an optimized peak demand factor within the calculated peak demand factors; and
    generating optimized power management system characteristics for the site corresponding with the optimized peak demand factor.

13. The method of claim 12, wherein the characteristic data further comprises:
a fourth factor representing the frequency of peaks occurring over a period of high average consumption at the site.

14. The method of claim 12, wherein the load samples are gathered at a rate at least approximately matching the rate at which a utility provider gathers load samples from the site in determining a demand charge.

15. The method of claim 12, wherein determining an optimized peak demand factor comprises:
calculating a ratio of peak demand factor to demand reduction level for each of the demand reduction levels; and
assigning the peak demand factor having the lowest ratio as the optimized peak demand factor.

16. The method of claim 12, wherein determining an optimized peak demand factor comprises:
plotting the peak demand factors against corresponding demand reduction levels; and
assigning the peak demand factor having a maximum second-order derivative of the plot as the optimized peak demand factor.

17. The method of claim 12, wherein determining an optimized peak demand factor comprises:
determining the costs of providing a power management system at the site corresponding with each peak demand factor;
calculating a ratio of the costs to demand reduction level for each of the demand reduction levels; and
assigning the peak demand factor having the lowest ratio as the optimized peak demand factor.

18. The method of claim 12, wherein the optimized power management system characteristics comprise an energy storage system minimum capacity level and a power converter minimum power output level.

19. The method of claim 12, further comprising:
providing an optimized power management system to the site having the optimized power management system characteristics.

20. A non-transitory computer-readable medium containing instructions, the instructions, when executed by a processor of a computer, causing the computer to perform steps comprising:
gathering a plurality of load samples from a site;
calculating peak demand factors for the site using the characteristic data for a plurality of demand reduction levels, wherein the characteristic data at least comprises:
a first factor representing a ratio of the number of peak-range load samples to the total number of load samples,
a second factor representing the ratio of the magnitude of one or more peak range load samples to a representative measure of central tendency of the load samples, and
a third factor representing the variance of the load samples;
determining an optimized peak demand factor within the calculated peak demand factors; and
generating optimized power management system characteristics for the site corresponding with the optimized peak demand factor.

\* \* \* \* \*